United States Patent [19]

Merrell

[11] 3,916,102

[45] Oct. 28, 1975

[54] SYNCHRONOUS/ASYNCHRONOUS PHASE LOCK CIRCUIT FOR A DIGITAL VERTICAL SYNC SYSTEM

[75] Inventor: Richard G. Merrell, Darien, Ill.

[73] Assignee: Zenith Radio Corporation, Chicago, Ill.

[22] Filed: Aug. 22, 1972

[21] Appl. No.: 282,737

[52] U.S. Cl. .......................................... 178/60.5 TV

[51] Int. Cl.$^2$ .......................................... H04N 5/04

[58] Field of Search .............................. 178/69.5 TV

[56] References Cited

UNITED STATES PATENTS

| | | | |
|---|---|---|---|
| 2,824,224 | 2/1958 | Fulmer | 178/DIG. 12 |
| 3,588,351 | 6/1971 | Baun | 178/69.5 TV |
| 3,683,107 | 8/1972 | Camras | 178/69.5 TV |
| 3,691,297 | 9/1972 | Merrell et al. | 178/69.5 TV |

*Primary Examiner*—Robert L. Griffin
*Assistant Examiner*—George G. Stellar
*Attorney, Agent, or Firm*—Joseph T. Downey; Nicholas A. Camasto

[57] ABSTRACT

A sync phase lock system in a digital synchronization system for maintaining coincidence between locally generated vertical sync pulses and vertical sync pulses derived from synchronous and asynchronous input signals. For synchronous operation, the phase lock system conditions and up/down binary counter to count, within predetermined limits, in an arbitrarily designated "up" direction only during the derived sync pulse interval and in the "down" direction at all other times. Each locally generated sync pulse applied to the up/down counter during the derived sync pulse interval generates one up count representative of coincidence between the derived and locally generated sync pulses. If the locally generated sync pulse occurs during the vertical trace interval, a down count indicating non-coincidence is initiated. The up/down binary counter is reset upon reaching its down counting limit, and the locally generated sync pulses are rephased to be coincident with the derived sync pulses. The phase lock system may be conditioned to asynchronous operation by a switching arrangement which holds the up/down counter at its down counting limit. Accordingly, the phase lock system rephases the locally generated sync pulse for each vertical field to be coincident with the corresponding derived asynchronous sync pulse. More particularly, to increase the system noise immunity, a locally generated pulse can be developed only if the derived sync pulse occurs during an arbitrarily defined time interval.

11 Claims, 6 Drawing Figures

SYNCHRONOUS/ASYNCHRONOUS PHASE LOCK CIRCUIT FOR A DIGITAL VERTICAL SYNC SYSTEM

CROSS-REFERENCES TO RELATED APPLICATIONS

The subject invention is an improvement of the syncrhonization phase lock system for a digital vertical synchronization system described and claimed in the copending application of Richard G. Merrell and Melvin C. Hendrickson, Ser. No. 140,852, now U.S. Pat. No. 3,691,297 issued Sept. 12, 1972, assigned to the assignee of the present invention.

BACKGROUND OF THE INVENTION

The present invention relates generally to improvements in television receivers and more particularly to a synchronous/asynchronous phase lock system for maintaining locally generated vertical sync pulses in an in-plase relationship with vertical sync pulses derived from synchronous and asynchronous signals applied to the input tuner stabe of a television receiver.

Prior to the development of digital synchronization systems, television receivers, for the most part, utilize integrated vertical sync pulses to trigger the receiver's vertical sweep system. Typically, this is accomplished by removing, or clipping, a portion of the vertical sync signal from the received composite video signal, integrating the resultant output and applying the integrated portion to a vertical osciallator. Such a system, however, is sensitive to ignition noise, airplane flutter, cochannel and adjacent channel interference, all of which may cause the system to react to false vertical sync pulses. The resultant vertical sync pulse may, as a result, have a shape, phase and amplitude differing from those signals resulting from the received vertical sync pulses. These variations result in the initiation of vertical sweep before the previous vertical sweep has been completed thereby impairing not only the interlace of alternate fields during each frame but also the proper super-position of successive frames resulting in the loss of picture resolution.

To eliminate this problem, digital vertical synchronization systems such as that described in the above-mentioned patent of Richard G. Merrell and Melvin C. Hendrickson were devised. As in most digital systems, a locally generated vertical sync pulse having relatively constant shape, phase and amplitude is applied to the vertical sweep generator. Of course, the locally generated vertical sync pulse must be maintained in a proper phase relationship with the received signal. Accordingly, some type of phase lock system must be included to maintain coincidence between the locally generated and received vertical sync pulses when the viewer switches or the television broadcast station switches from one source to another. Such a system immunizes the receiver from misadjustment of the vertical frequency control. Consequently, a television receiver utilizing a digital vertical system need not have provision for an external vertical hold control as was previously required.

A problem arises, however, where the television receiver is designed to accept input signals form sources other than television brodcast stations. More specifically, over-the-air television broadcast stations. More specifically, over-the-air television brodcasts are required to include vertical sync pulses at a rate (i.e., every 262½ horizontal lines) prescribed by the existing NTSC standards. These transmitted vertical sync pulses are referred to as being synchronous, i.e., occurring at the designated rate. With the rapid proliferation of cable television (CATV) systems, however, increasing emphasis has been placed on designing television receivers which can accept CATV signals or the like at an auxiliary input and apply them to the input tuner stage. Quite often, the CATV station must originate its own programming; but unfortunately, its transmitting equipment may be such that the vertical sync pulses it generates are asynchronous. That is, the vertical sync pulses occur at some rate (e.g., every 262½ horizontal line) other than the 262½ line rate specified for over-the-air transmissions, or the vertical sync pulses may not be locked in fixed time relation with the horizontal sync pulses (random interlace). Thus, the originating CATV station may, for example, generate a vertical sync pulse after every 263½ horizontal line whereas over-the-ir transmitters must provide the sync pulse after every 262½ horizontal lines. This is manfiested on the cathode-ray screen as a picture which is shifted down one line due to the early initiation of the vertical sweep. The picture will continue to "roll down" until the phase-lock system rephases the locally generated sync pulse. At that time, the picture will be "slammed" back into phase and the picture will once again begin to roll. Accordingly, for asynchronous operation, the locally generated vertical sync system should be rephased during each vertical field so that the locally generated sync pulse coincides with the sync pulse derived from the CATV transmission.

SUMMARY OF THE INVENTION

Accordingly, it is an object of the present invention to provide new and improved circuitry for automatically maintaining coincidence between locally generated vertical sync pulses and received vertical sync pulses during synchronous and asynchronous operation.

It is also an object of the invention to provide an improved synchronization phase lock system which eliminates the need for a vertical hold control.

A further object of the invention is to provide an improved synchronization phase lock system which is suitable for fabrication as in integrated circuit.

In accordance with the present invention, a synchronization phase lock system is provided for maintaining coincidence between locally generated vertical sync pulses and vertical sync pulses derived from received synchronous and asynchronous signals. The synchronization phase lock system of the present invention contemplates the utilization of the derived sync pulses to condition an up/down bianry counter to count toward a maximum confidence level when the locally generated vertical sync pulses are in time coincidence with the derived sync pulses. The counter, however, counts toward a minimum confidence level when the locally generated sync pulses and the derived sync pulses are non-coincident. A gating arrangement rephases the locally generated sync pulses to be coincident with the derived sync pulses whenever the counter counts to its minimum confidence level. The synchronization phase lock system further includes means for maintaining the counter at its minimum confidence level during the reception of asynchronous signals. Thus, the means rephases each locally generated sync pulse to coincide with the corresponding derived sync pulse.

BRIEF DESCRIPTION OF THE DRAWINGS

The features of this invention which are believed to be novel are set forth with particularity in the appended claims. The invention together with its further objects and advantages thereof, may be best understood, however, by reference to the following description taken in conjunction with the accompanying drawings, in which like reference numerals identify like elements in the several figures and in which:

PREFERRED EMBODIMENT OF THE INVENTION

Figure 1:
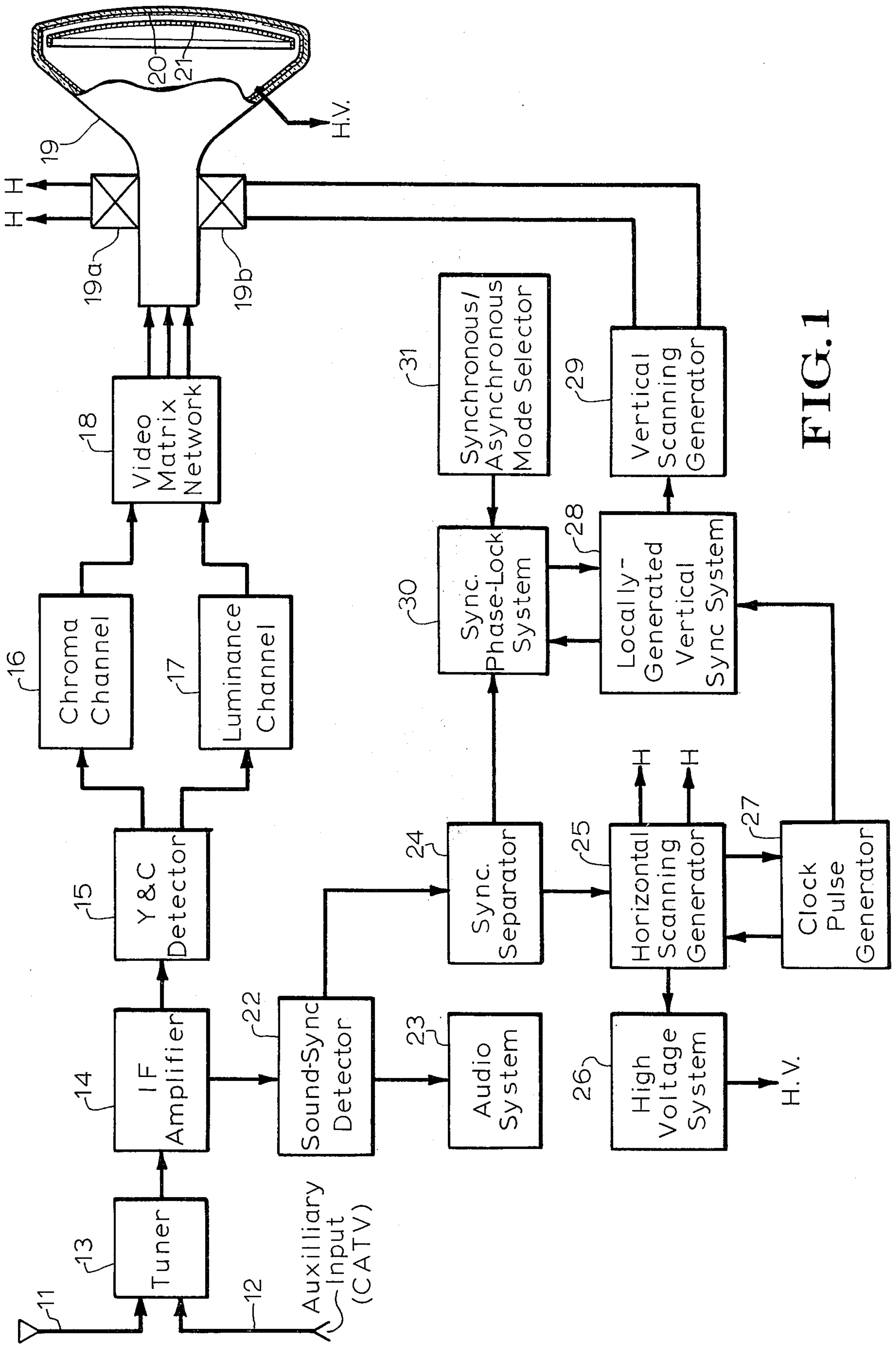
FIG. 1 is a block diagram of a television receiver which includes a synchronization phase lock system in accordance with a preferred embodiment of the invention.

Referring now to FIG. 1, a color television receiver is shown which incorporates a synchronous/asynchronous phase lock arrangement for a digital synchronization system in accordance with the present invention. The receiver includes an antenna 11 which intercepts telecast signals and couples them to an input tuner stage 13. Alternatively, the radio frequency (RF) signals may be applied to the input tuner stage 13 through an auxiliary input 12 connected, for example, to a cable television (CATV) network. At the input tuner stage 13, a particular received signal is selected, amplified and converted to an intermediate frequency in the well known manner before being coupled to an intermediate frequency (IF) amplifier 14 where it is further amplified. The processed signal is then coupled to a luminance (Y) and chrominance (C) detector 15, and also to a sound-sync detector 22.

The detected chrominance information from Y and C detector 15 is connected to a chroma channel 16 which develops the signals R-Y, B-Y and G-Y that are applied to the video matrix network 18 as one of the informational inputs thereto. The detected luminance information form detector 14 is similarly connected to a luminance channel 17 wherein the luminance signals are processed prior to application to the video matrix network 18, forming the other of its informational inputs. Appropriate matrixing occurs within matrix network 18 such that signals containing the correct brightness, hue and color saturation information are derived and applied to the appropriate control electrodes of the image reproducer 19 in a manner understood in the art.

The image reproducer 19, which for illustrative purposes only, is shown to be a conventional shadow mask cathode-ray tube, includes a tri-color image screen or target 20 to be scanned by a group of three electron beams developed by individual guns housed within the tube itself. A parallax mask 21 is included in the cathode-ray tube 19 to restrict the electron beams generated by the guns in a known manner, so that each beam is permited to impinge only upon phosphor dots of a single color on image screen 20. The electron beams are suitably modulated by the luminance and chrominance information such that their traverse of screen 20 results in the production of a visual image. Since the parallax or shadow mask 21 enables each electron beam to see but a single color phosphor on its traverse of screen 20, the reproduction is, in fact, that of three image fields effectively superposed to yield an image in simulated natural color. Although the color signals R, G and B are applied directly to the three cathodes of picture tube 19, in the embodiment of the receiver as herein shown, it should be understood that other systems are equally compatible such as those receivers designed to utilize color-difference signals. The type of chroma processing is not directly related to the subject matter of the present invention and is in no way critical to its operation.

Sound-sync detector 22 connects to an audio system 23 having appropriate circuitry for reproducing the audio portion of the received signal. Sound-sync detector 22 further connects to a sync separator 24 wherein the sync portion of the received signal is stripped from the composite video signal to develop horizontal and vertical synchronization pulses. The horizontal sync pulses which occur at a 15.75 $kH_z$ rate are, in turn, coupled to a horizontal scanning generator 25 wherein appropriate horizontal (line) scanning signals are developed for application to the appropriate deflection yoke 19*a* positioned on the image reproducer 19. The horizontal scanning signals are further coupled to a high voltage system 26 which develops a high voltage accelerating potential for application to the cathode-ray tube 19. The horizontal scanning generator 25 is also coupled to a clock pulse generator 27 wherein the 15.75 kHz horizontal scanning signals are doubled to provide a clock pulse train occurring at a 31.5 kHz rate. In turn, a locally generated vertical synchronization system 28 coupled to the output of clock pulse generator 27 counts the 31.5 kHz pulses to develop locally generated vertical (60 Hz) sync pulses. The locally generated vertical sync pulses are then coupled to a vertical scanning generator 29 wherein appropriate scanning (field) signals are developed for application to deflection yoke 19*b*.

As thus far described, the receiver is conventional in general construction and operation such that further and more particular operational description should not be necessary. More particular consideration, however, may now be given to that portion of the receiver which relates to the preferred embodiment of the present invention, and in general constitutes synchronization phase lock circuitry in conjunction with a locally generated vertical synchronization system.

In accordance with the present invention, a synchronization phase lock system 30 operable in both synchronous and asynchronous modes is coupled to sync separator 24 and receives vertical sync pulses therefrom. During synchronous operation, a second input from the locally generated vertical sync system 28 is coupled to the phase lock system 30 wherein coincidence or non-coincidence of the locally generated sync pulses and the received vertical sync pulses is determined. Upon finding a non-coincident condition for a predetermined number of vertical fields, phase lock system 30 will generate a correction signal that is applied to the locally generated sync system 28 for correcting its phase to be coincident with the received vertical sync pulses. During asynchronous operation, however, the phase lock system 30 generates a correction signal for each vertical field and applies it to the locally generated sync system 28, rephasing it to coincide with the received vertical sync pulse for each field. Also, a synchronous/asynchronous mode selector 31 is connected to the phase lock system 30 for determining in which mode the digital vertical sync system will be operating.

As previously mentioned, locally generated vertical sync pulses occurring every 262½ horizontal lines are developed during synchronous operation by counting 524 of the 31.5 kHz clock pulses and generating output pulses suitable for use as vertical sync pulses on each 525th clock pulse. This may be better understood by reference to FIG. 2. There, negative $\overline{\phi}$ clock pulses occurring at a 31.5 kHz rate are coupled from clock pulse generator 27 (FIG. 1) to the first of ten serially-connected binary flip-flops (not shown) comprising a binary counter arrangemnt 40. Each successive flip-flop, beginning with that one initially receiving the clock pusles, represents an increasing power of two (i.e., $2^0$, $2^1$, $2^9$) so that any particular number of input $\overline{\phi}$ clock pulses can be counted and represented by the binary-encoded output of counter 40. That is, each flip-flop is normally in its low (L), or 0 state until it is switched to its high (H), or 1, state by the clock pulse corresponding to the decimal number which is being encoded. For example, when the first clock pulse is counted, the output of counter 40 corresponding to the $2^0$ flip-flop will change states from 0 to 1, and the output of counter 40 will appear as 0000000001, the binary equivalent of the decimal number 1. Subsequently, when the second $\overline{\phi}$ clock pulse is counted the output of the $2^0$ flip-flop will return to 0 while the state of the $2^1$ flip-flop will change to 1. The output of counter 40 is then 000000010 corresponding to the decimal number 2. Each subsequent $\overline{\phi}$ clock pulse will therefore change the output of counter 40 to represent that particular decimal numbered pulse in binary-coded form.

Accordingly, the $2^0$, $2^2$, $2^3$, $2^9$ flip-flops will all be in their high (1) state upon counting the 525th $\overline{\phi}$ clock pulse, while the other flip-flops will be in their low (0) state. Thus, the binary code 1000001101, which is unique to the 525th count, will be developed at the output terminals of the counter 40. For each count up to and including 525, the $2^0$, $2^2$, $2^3$ and $2^9$ flip-flops will not all be high (1) at the same time.

The output terminals of counter 40 corresponding to the $2^0$, $2^2$, $2^3$ and $2^9$ flip-flops are, in turn, coupled to the input terminals 41*a*, 41*b*, 41*c* and 41*d*, respectively of NAND 41 comprising the 525-count gate. When all of the inputs to NAND 41 become high (1), its output 41*z* will be switched from its high (H) state to its low (L) state until at least one of its input terminals again goes low (0). At that time, the output 41*z* will return to its high (H) state so that a negative-going pulse coinciding with the 525 $\overline{\phi}$ clock pulse is developed at output 41*z*. The negative pulse at output 41*z* is then coupled to the input 42*a* of NAND 42 comprising the synchronous/asynchronous gate while its other input 42*b* is coupled to the $\overline{S}$ terminal of the synchronous/asynchronous mode selector shown generally at 31. Whenever the receiver is operating in the synchronous mode, the $\overline{S}$ signal applied to input 42*b* will be maintained at a low (L) level so that the negative pulse from 525-count gate 41 will produce a positive-going pulse at output 42*z*.

An inverter 43 inverts the signal at output 42*z* and applies the resultant negative pulse to the input terminal 44*b* of a NAND 44 which is interconnected with NAND 45 to form an RS flip-flop. In this configuration, the output 44*z* of NAND 44 is coupled to input terminal 45*b* of NAND 45 while output 45*z* is coupled to input 44*a* of NAND 44. A third input terminal 44*c* is connected to the output of 532-count NAND gate 100 which, during synchronous operation, is always high(H), and positive clock pulses are applied to the input terminal 45*a* of NAND 45. At all times prior to the 525th clock pulse, all inputs to NAND 44 are high (H) and input 45*b* of NAND 45 is low (L) so that their outputs 44*z* and 45*z* are in their respective quiescent states; that is, the output 44*z* is at a low (L) level, and the output 45*z* is high (H). As may be more easily understood by reference to FIG. 3*a*, the negative pulse from inverter 43 is applied to input 44*b* coincident with the 525th pulse while a positive pulse is simultaneously applied to input 45*a*. Thus, the outputs 44*z* and 45*z* will be switched to their respective high (H) and low (L) states. Subsequently, the trailing edge of the clock pulse at input 45*a* will reset NAND 44 and NAND 45 to their original states, low (L) and high (H), respectively. Accordingly, positive and negative output pulses occurring every 262½ horizontal line are developed coincidentally with each 525th clock pulse.

The negative-going pulse developed at output 45*z* is then coupled to a "reset" NOR gate 46. Whenever the signal at either of the two inputs 46*a* and 46*b* goes low (L), the output 46*z* will be switched to its high (H) state. Since input 46*b* is normally high (H), the negative pulse from NAND output 45*z* will produce a corresponding positive pulse at output 46*z*. This pulse is, in turn, applied to a pulse stretching network 47 where it is "stretched" to a predetermined length. For example, in the present embodiment, a pulse (V out) of 8 horizontal lines duration is developed to provide a locally generated vertical sync pulse which may then be applied to the vertical scanning generator 29 (FIG. 1). The pulse developed at the output 46*z* of "reset" NOR gate 46 is also coupled to the reset terminal 40*r* of counter 40 to reset all of the binary flip-flops to their low (0) state in anticipation of resuming the count from zero with next clock pulse.

Figure 2:
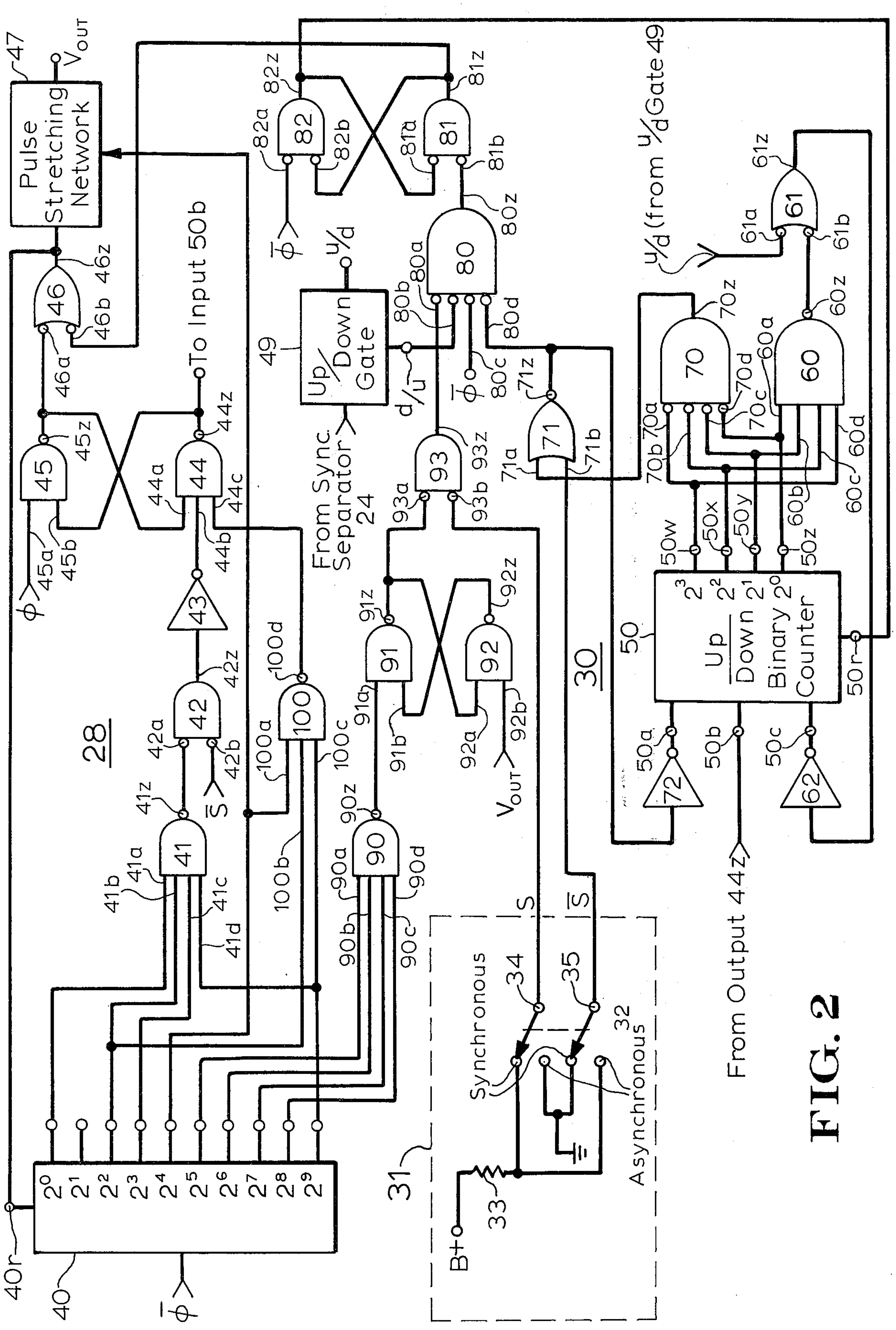
FIG. 2 is a combined schematic and block diagram of a digital vertical synchronization system including a synchronization phase lock arrangement.

The positive-going pulses at output 44*z*, are coupled to the input 50*b* of an up/down binary counter 50 comprising a portion of the synchronization phase lock system identified generally at 30 in FIG. 2. Each pulse applied to input 50*b* initiates one count in either the up or down direction within counter 50. Arbitrarily, counter 50 is conditioned to count up toward a maximum confidence level (15) whenever the positive pulses from output 44*z*, which are representative of the corresponding locally generated sync pulses, are coincident with the received vertical sync pulses. If the locally generated pulses and the received pulses are non-coincident, however, counter 50 will count down to a minimum confidence level (o) at which time corrective action is automatically undertaken to correct the phase relationship between the locally generated sync pulses and the received sync pulses.

Figures 3A, 3B, 3C:
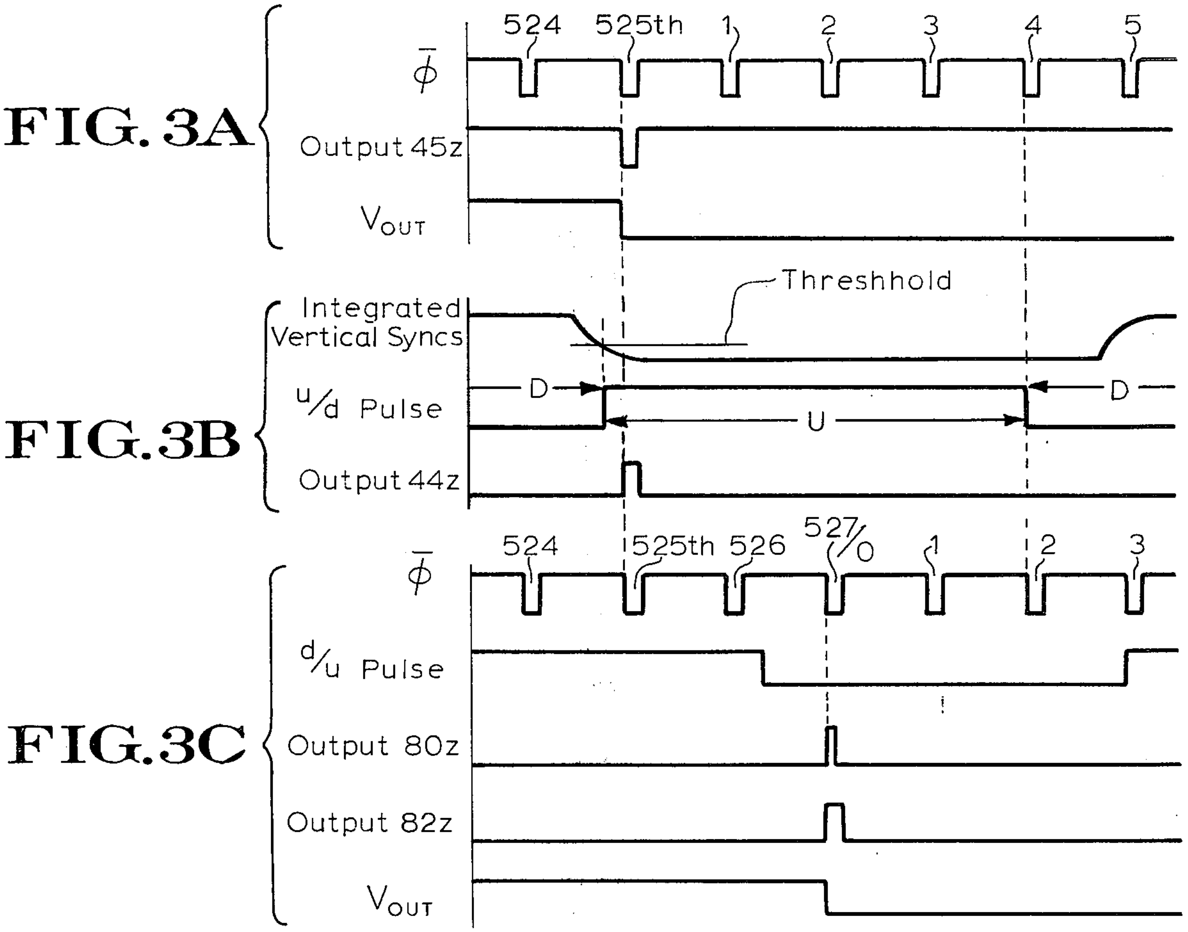
FIG. 3 comprised of FIGS. 3A–3C is illustrative of a selective waveforms associated with the synchronous operation of the synchronization phase lock system of the preferred embodiment.

In order to condition counter 50 to count in the up direction during the received sync pulse interval, the received vertical sync pulses from sync separator 24 (FIG. 1) are integrated and applied to an up/down gating arrangement 49. As shown in FIG. 3*b*, the up/down gate 49, in turn, generates an up/down (U/D) control pulse beginning at a point where the leading edge of the integrated sync pulse crosses a predetermined threshold and continues for a period ending with the leading edge of the fourth pulse following the leading edge. No further up/down pulses can be generated during the following 14 horizontal lines; this guards against the development of a second up/down pulse due to extra-long received vertical sync pulses.

The up/down (*u/d*) gating pulses are then applied to the input 61*a* of NOR 61, switching its output 61*z* from its normally high (H) state to its low (L) state for the interval corresponding to the up/down pulse. The pulse at output 61*z* is subsequently inverted by an inverter 62 to provide a positive gating pulse at input 50*c*. Thus, during interval U in FIG. 3*b*, the up/down counter 50 is conditioned to count in the up direction. At all other times (interval D), counter 50 is conditioned to count down. As was previously noted, counting is initiated by coupling the positive output pulse at output 44*z* which is representative of the locally generated vertical sync pulse, to input 50*b* the up/down counter 50. If counter 50 is conditioned to count down, the positive pulse at input 50*b* will cause the counter 50 to count down, indicating that the locally generated vertical sync pulse and the received sync pulse are out-of-phase. If, however, the positive pulse is applied to input 50*b* during interval U when counter 50 is conditioned to count up, counter 50 will count one integer up indicating that the locally generated pulse and the received pulse are coincident. Accordingly, up/down counter 50 will eventually count up to its maximum binary capacity (15), down to its minimum capacity (0), or between the maximum and minimum depending on the coincidence or lack thereof between the locally generated vertical sync pulses and the received vertical sync pulses.

Assuming for the present that synchronous signals are being received by the television receiver and that the up/down counter 50 has counted to its maximum confidence level, indicating absolute confidence that the locally generated pulses and the received sync pulses are in phase, there is no reason to rephase the locally generated vertical sync system 28 (FIG. 1). Therefore, a maximum confidence gate comprising NAND 60 with inputs 60*a*, 60*b*, 60*c*, and 60*d* is coupled to the up/down counter outputs 50*w*, 50*x*, 50*y*, and 50*z*, respectively, which combine to provide a binary-encoded output equivalent to the count (confidence level) reached at any time by counter 50. For example, if the confidence level is at eleven, the states of outputs 50*w*, 50*x*, 50*y*, and 50*z* will be 1011 respectively. As may be easily understood, their respective binary-encoded outputs for 0 and 15 will be 0000 and 1111, respectively. The NAND output 60*z* is, in turn, serially-connected to NOR input 61*b*. Consequently, it is only when up/down counter 50 reaches its maximum confidence level that each of its output terminals (50*w–z*) are simultaneously in their high (H) state. Accordingly, NOR output 61*z*, responsive to the resultant low (L) signal applied to its input 61*b*, will be held in its high (H) state irrespective of whether the up/down signal applied to input 61*a* would normally condition counter 50 to count up or down. The high signal (H) is then coupled through inverter 62 so that a low (L) level, or down, signal is applied to counter input 50*c* even during the interval when the received vertical sync pulse could be expected to condition the counter 50 to count up. Thus, the up/down counter 50 is conditioned to count down upon receipt of the next locally generated vertical sync pulse at input 50*b* even though the locally generated pulse and the received vertical sync pulse may be in-phase. Upon receipt of the next locally generated pulse at input 50*b*, the up/down counter 50 will, in fact, count down to a level (14) one integer below the maximum confidence level. With the up/down counter 50 registering a less-than-maximum count (14), outputs 50*w*, 50*x*, 50*y*, and 50*z* will not be in their high (H) state. If the next positive pulse at input 50*b* occurs while the locally generated pulse is in-phase with the received sync pulse, the up/down counter 50 will again count up to its maximum (15) confidence level. Accordingly, as long as the locally generated pulses and the received sync pulses are in-phase, up/-down counter 50 will oscillate between the 14th and 15th count. If, on the other hand, they are not in-phase, up/down counter 50 will continue to count down until coincidence between the two signals is attained or it reaches its minimum (0) confidence level.

If the up/down counter 50, in fact, counts down to its minimum (0), the locally generated vertical sync system 28 (FIG. 1) must be reset so the locally generated pulses it produces are in-phase with the received vertical sync pulses. To this end, the up/down counter outputs 50*w*, 50*x*, 50*y*, and 50*z* are further coupled to the inputs 70*a*, 70*b*, 70*c*, and 70*d* of NAND 70 which comprises, in part, a minimum confidence gate. When the four outputs (50*w–z*) of up/down counter 50 are in their low (L) states corresponding to a confidence level of zero (0), NAND 70 switches from its low (L) state at output 70*z* to a high (H) state. The high (H) level signal is then applied to the input 71*a* of NOR 71, which together with NAND 42 and NAND 93 comprises the synchronous/asynchronous gate, producing a low (L) level signal at output 71*z* that is, in turn, coupled to input 80*d* of NAND 80. The other input, 71*b*, is maintained at a low (L) level by the synchronous-/asynchronous mode selector 31 during synchronous operation. Consequently, a low (L) signal can be applied to input 80*d* during synchronous operation only when up/down counter 50 is at its minimum confidence level, O. The low (L) level signal is also coupled through an inverter 72 to input 50*a* of the up/down counter 50.

NAND 80 comprising a minimum confidence reset gate is a four-input device having its first input 80*a* coupled to the output 93*z* of synchronous/asynchronous gate (NAND) 93 which is maintained in its low (L) state during synchronous operation. Inverted up/down (*d/u*) control pulses from the up/down gating arrangement 49 are coupled to input 80*b* while clock pulses are coupled to input 80*c*. After up/down counter 50 reaches 0, the minimum confidence gate 70 will maintain input 80*d* at a low (L) level until the locally generated sync system 28 (FIG. 1) can be rephased to coincide with the received vertical sync pulses. As shown in FIG. 3*c*, a reset pulse is generated at output 80*z* at the first instance subsequent to up/down counter 50 reaching 0 where the inverted up/down (*d/u*) pulses and the clock pulses are low (L). The reset pulse is then applied to the input 81*b* of the NAND 81 which together with NAND 82 comprises an RS flip-flop for stretching the reset pulse. That is, the output 81$z$ of NAND 81 is coupled to input 82$b$ of NAND 82, and NAND output 82$z$ is connected to input 81$a$. NAND input 82$a$, in turn, is coupled to the source of clock pulses. Normally, NAND output 81$z$ is at a high (H) level and NAND output 82$z$ is at a low (L) level, as illustrated in FIG. 3$c$. However, when the reset pulse is coupled to input 81$b$, outputs 81$z$ and 82$z$ will switch to their low (L) and high (H) states, respectively, and will remain in those states until the trailing edge of the next clock pulse resets the RS flip-flop to its original state. The positive stretched pulse (FIG. 3$c$) developed at output 82$z$, when applied to reset terminal 50$r$, resets the up/-down counter 50 to intermediate (8) counting level prior to the next count. This, of course, means that all of the outputs 50$w$–$z$ of up/down counter 50 are no longer low (L); therefore, output 80$z$ switches to its low (L) state.

The negative stretched pulse generated at output 81$z$ is, in turn, coupled to input 46$b$ of the NOR reset gate 46. Accordingly, this pulse will switch the output 46$z$ to its high (H) state thereby providing locally generated vertical sync pulse at V out and a reset pulse to reset terminal 40$r$ of counter 40. As a result, counter 40 is ready to begin a new counting cycle at some finite time after the trailing edge of the reset pulse has been applied to reset terminal 40$r$. Since counter 40 initiates a new counting cycle immediately following receipt of a vertical sync pulse by sinc separator 24, the next wire locally generated vertical sinc pulse coincide with the following integrated vertical sync pulses, and counting will proceed in the up direction until the maximum confidence level is reached or synchronization is again lost.

In accordance with the present invention, the locally generated vertical sync system of the preferred embodiment is conditionable to develop locally generated sync pulses responsive to asynchronous input signals as well as synchronous signals. For example, when the television receiver derives its input signals from auxiliary input 12 (FIG. 1), it is very likely that the received sync pulses are not synchronous; that is, the received sync pulses may be occurring at some rate other than every 262½ horizontal line as is specified by the NTSC standards e.g., every 527th clock pulse (263½ lines) as in FIG. 4. Accordingly, a synchronous/asynchronous mode selector 31 comprising a simple switching arrangement is provided for selectively coupling a reference potential (B+) to the previously-identified synchronous/asychronous gates in the locally generated sync system 28 and the phase lock system 30, conditioning them to function in either the synchronous or asynchronous mode. More particularly, the mode selector 31 comprises a double-pole, double-throw (DPDT) switch 32 having two of its poles coupled to the B+ potential through resistor 33, while its remaining two poles are connected directly to ground. As shown in FIG. 2, therefore, the signal (S) at the output terminal 34 is high (H) when switch 32 is in its synchronous position, while the signal ($\overline{S}$) at output 35 is at ground (L) potential. Conversely, when asynchronous signals are applied to auxiliary input 12, the switch 32 is switched to the asynchronous position so that the S signal is low (L) and the $\overline{S}$ signal is high (H). Thus, as was previously explained with regard to synchronous operation, input 42$b$ of synchronous/asynchronous gate 42 is held at a low (L) level so that an output pulse can be generated at output 42$z$ when the 525th clock pulse is applied to input 42$a$. Since there can be no certainty that the received sync pulses are occurring at a 262½ horizontal line rate during asynchronous reception, the development of a locally generated vertical sync pulse responsive to the 525th clock pulse is suppressed by applying the high (H) level $\overline{S}$ signal to input 42$b$, and consequently, output 42$z$ is maintained at a low (L) output level.

Since there can be no reasonable degree of confidence that the locally generated sync pulses and the received sync pulses will coincide during typical asynchronous operation, the sync pulse lock system 30 must must be prepared to rephase the locally generated sync pulse for each vertical field so that it coincides with the received asynchronous sync pulses. To accomplish this, a "window" of predetermined time interval is generated during which a locally generated sync pulse may be generated to coincide with the received asynchronous pulse and to reset counter 40 to its zero count. Since the sync pulse may be generated during a narrow time interval in each field, noise occurring at other times will not adversely affect the noise immunity of the locally generated sync system. If during the window interval no received asyhchronous sync pulse has been detected, the locally generated vertical sync system will generate a sync pulse on the 532nd count in anticipation that no received sync pulse is forthcoming. The counts at which the window begins and ends and at which the clock pulse is finally generated in the absence of a received sync pulse is entirely arbitrary and may be selected according to other design considerations. In the present embodiment, the window has been arbitrarily selected to begin at the 480th count and end with the 532nd count.

Operationally, a 480-count gate comprising NAND 90 has four inputs 90$a$, 90$b$, 90$c$, and 90$d$, which are correspondingly coupled to the $2^5$, $2^6$, $2^7$ and $2^8$ outputs of counter 40. Thus, when counter 40 reaches the 480th count all of these outputs ($2^5$, $2^6$, $2^7$, $2^8$) are high (H), and the output 90$z$ will switch to its low (L) state. This signal is, in turn, applied to the input 91$a$ of NAND 91 which together with NAND 92 combines to form an RS flip-flop. Thus, output 91$z$ is interconnected with input 92$a$ while the output 92$z$ interconnects with input 91$b$. The input 92$b$ is coupled to the output of the pulse stretching network 47 which is normally high (H). When a pulse is applied to input 91$a$ responsive to the 480th count, a high (H) level pulse, initiating with the 480th clock pulse and ending with the leading edge of V out, is developed at output 91$z$ (FIG. 4) and applied to input 93$a$ of the synchronous-/asynchronous gate (NAND) 93. During asynchronous operation, the other input 93$b$ of NAND 93 is held in its low (L) state by the S signal from the synchronous-/asynchronous mode selector 31. Accordingly, when the positive pulse from output 91$z$ is applied to input 93$a$, output 93$z$ which is normally high (H) switches to provide a low (L) level input signal to input 80$a$ of the minimum confidence reset gate 80 previously described with respect to synchronous operation. Further, the high (H) level $\overline{S}$ signal from mode selector 31 is applied to input 71$b$ of synchronous/asynchronous gate 71 during asynchronous operation. The low (L) level signal applied to input 80$d$, in effect, maintains the up/down counter 50 at its minimum confidence level thereby allowing the phase lock system 30 to force during each vertical field, the locally generated vertical sync system 28 to generate a vertical sync pulse (V out) during the window interval.

Figure 4:
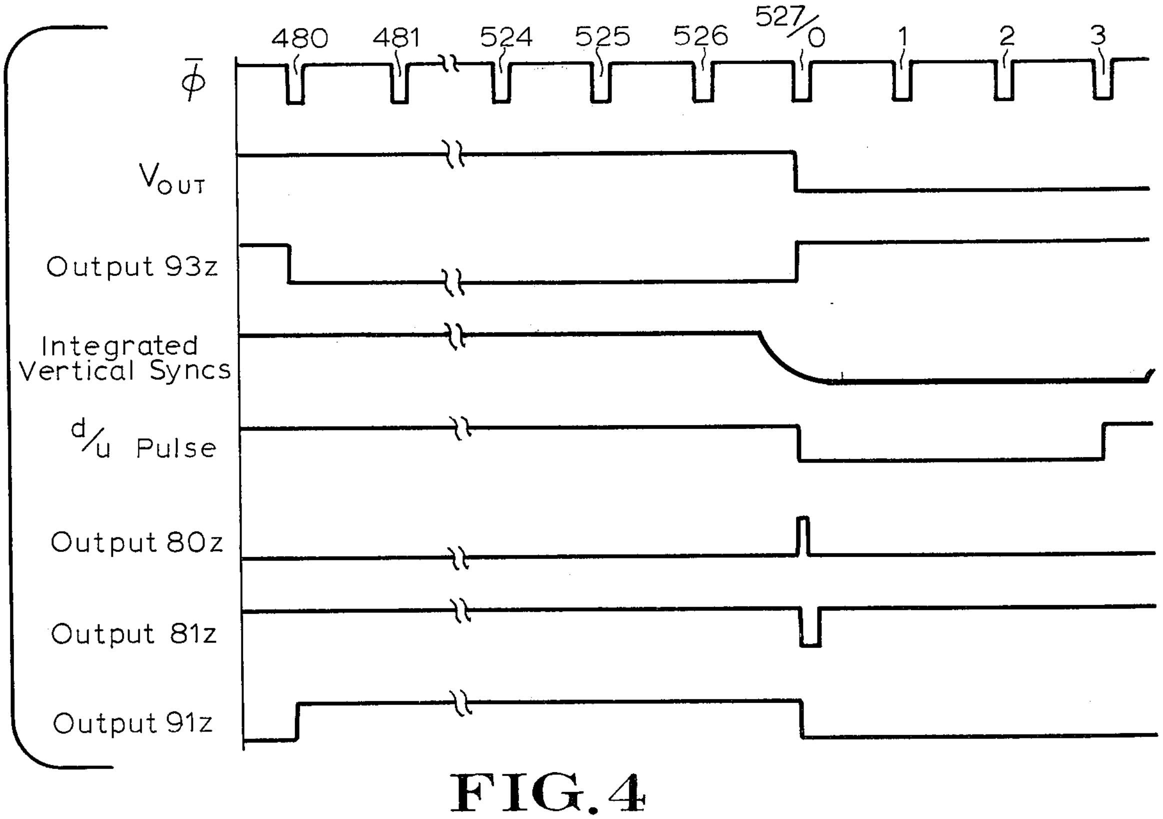
FIG. 4 is illustrative of selected waveforms associated with the asynchronous operation of the synchronization phase lock system of the preferred embodiment.

More particularly, as shown in FIG. 4, when all the inputs to NAND 80 are low (L) upon coincidence of the inverted up/down ($d/u$ ) pulse at input 80*b* the clock pulses at input 80*c*, a high (H) level pulse is generated at output 80*z* and applied to input 81*b* of the RS flip-flop comprising NANDs 81 and 82. A negative-going (L) pulse is developed at output 81*z* and applied through NOR 46 to the pulse stretching network 47 for developing a locally generated vertical sync pulse, V out. Since the leading edge of the inverted up/down ($d/u$) ) pulse coincides very nearly with the leading edge of the integrated received sync pulse, the resulting locally generated pulse coincides with the received pulse. Subsequently, the V out pulse is applied to input 92*b* to return output 91*z* to its low (L) state (FIG. 4).

If a received sync pulse has not been detected during the window interval, i.e., after the 480th count, but before the 532nd count, a sync pulse will be locally generated on the 532nd count on the assumption that any sync pulse that might be received should, in fact, have been received by that time. To this end, a 532-count NAND gate 100 has three inputs 100*a*, 100*b*, and 100*c* connected to the $2^2$, $2^4$, and $2^9$ output terminals of counter 40. It is all only on the 532nd count that all of the inputs to NAND 100 will be at a high (H) level producing a low (L) level pulse at output 100*z*.

The pulse developed at output 100*z* is then fed to the input 44*c* of the RS flip-flop comprising NANDs 44 and 45 which was previously described in connection with the synchronous operation of the receiver. Since input 44*b* is maintained at a high (H) level by the $\overline{S}$ signal applied to input 42*b* during asynchronous operation, the low (L) level pulse applied to input 44*c* upon the 532nd count causes output 45*z* of the RS flip-flop to provide a low (L) level pulse to input 46*a* of NOR 46. In turn, the high (H) level pulse at output 46*z* is coupled to the pulse stretching network to provide a locally generated vertical sync pulse (V out) of a predetermined length at its output. Again, the pulse at output 46*z* is coupled back to the reset terminal 40*r* to reset counter 40 to zero.

During synchronous operation, however, the 532nd count is never reached because counter 40 is reset to zero upon reaching the 525th count and producing a locally generated sync pulse. Similarly, if during asynchronous operation a received sync pluse is detected during the window interval, the counter 40 is reset to zero at that time without ever reaching the 532nd count.

Accordingly, the syncronization phase lock system of the present invention is effective to maintain the locally generated and received vertical sync pulses in a proper phase relationship. If, during sychronous operation, the two signals should in fact reach a point (minimum confidence level) where they become unsynchronized, the phase lock system will react by rephasing the locally generated vertical sync pulses to be coincident with the received vertical sync pulses thereby restoring synchronization. During asynchronous operation, however, the locally generated vertical sync pulses are rephased during each vertical field to be coincident with the derived asynchronous sync pulses. As a result, a vertical hold control is no longer necessary. Furthermore, since the phase lock system utilizes digital logic circuitry exclusively, the complete vertical synchronization system may be incorporated as a monolithic integrated circuit.

While a particular embodiment of the present invention has been shown and described, it will be obvious to those skilled in the art that various changes and modifications may be made without departing from the invention in its broader aspects. Accordingly, the aim in the appended claims is to cover all such changes and modifications as may fall within the true spirit and scope of the invention.

what is claimed is:

1. In a digital vertical synchronization system of the type including a source of locally generated vertical sync pulses comprising counting means for counting horizontal sync pulses and means for producing a local vertical sync pulse after counting a predetermined number of horizontal sync pulses, said source of locally generated vertical sync pulses coupled to and driving a vertical sweep system not including a free-running vertical oscillator, said vertical synchronization system further including a source of derived vertical sync pulses developed from a received television signal and a synchronization phase lock system including gating means for rephasing the locally generated vertical sync pulses to bring them into coincidence with the derived vertical sync pulses, the improvement comprising:

detection means coupled to said counting means for establishing an interval by detecting predetermined minimum and maximum count values, and mode selection means including a selector switch and a plurality of mode gates for alternatively operating said vertical sync system in synchronous or asynchronous modes, said plurality of mode gates, when in said asynchronous mode, rendering said detection means effective and conditioning said gating means for rephasing each locally generated vertical sync pulse for coincidence with a derived vertical pulse occurring within said interval.

2. The digital vertical synchronization system of claim 1 wherein said detection means includes means for producing a local vertical sync pulse at the end of said interval in event of non-occurrence of a derived vertical sync pulse within said interval.

3. The digital vertical synchronization system of claim 2 wherein said detection means comprise first and second NAND gates coupled to said counting means, said first NAND gate responding whenever said counting means attains said maximum count value and said second NAND gate responding whenever said counting means attains said minimum count value.

4. The digital vertical synchronization system of claim 3 wherein said source of locally generated vertical sync pulses further includes recognition means for recognizing said predetermined number of horizontal sync pulses; one of said plurality of mode gates being coupled to said recognition means for disabling said recognition means when in said asynchronous mode.

5. The digital vertical synchronization system of claim 4 wherein said recognition means includes a third NAND gate and wherein said one mode gate includes a fourth NAND gate, said third NAND gate having an input coupled to said counting means and an output coupled to said forth NAND gate.

6. The digital vertical synchronization system of claim 5 wherein said plurality of mode gates further includes a fifth NAND gate coupled to said second NAND gate for rendering said second NAND gate effective in said asynchronous mode.

7. The digital vertical synchronization system of claim 6 wherein said plurality of mode gates further includes a NOR gate interconnected with said synchronization phase lock system for conditioning said gating means for rephasing each locally generated vertical sync pulse for coincidence with said derived vertical pulse occurring within said interval.

8. In a digital vertical sync system of the type including a horizontal sync pulse-driven source of locally generated vertical sync pulses coupled to and driving a vertical sweep system and a source of derived vertical sync pulses developed from a received television signal, a synchronization phase lock system including circuit means coupled to the source of derived vertical sync pulses for developing a control voltage having a first level during the sync portions of said derived vertical sync pulses conditioning said counter means to count up toward a maximum confidence level and a second level during the trace portions conditioning said counter means to count down toward a minimum confidence level, counter means coupled to the circuit means and to the source of locally generated vertical sync pulses for counting up to said maximum confidence level during coincidence between the locally generated vertical sync pulses and the derived vertical sync pulses and for counting down to said minimum confidence level during noncoincidence therebetween, gating means coupled betwen said counter means and said source of locally generated vertical sync pulses for rephasing the local sync pulses to bring them into time coincidence with the derived sync pulses by generating a reset signal coincident with the first locally generated vertical sync pulse occurring during said first level of said control voltage subsequent o said counter means reaching said minimum confidence level, feedback means developing an override signal whenever said counter means reaches said maximum confidence level for forcing said counter means to count down upon receipt of the next said locally generated vertical sync pulse irrespective of the level of said control voltage, the improvement comprising:

mode selection switch means for alternately operating said vertical sweep system in synchronous and asynchronous modes, said switch means conditioning said gating means for rephasing each locally generated vertical sync pulse to coincide with a derived vertical sync pulse when said vertical sweep system is operating in said asynchronous mode; and noise immunizing means coupled to said gating means and effective when said system is in said asynchronous mode, comprising a NAND gate coupled between said source of locally generated sync pulses and said gating means, said NAND gate developing a reset inhibit signal at all times other than an interval beginning with a predetermined minimum number of horizontal sync pulses and ending a predetermined maximum number of horizontal sync pulses later, said reset inhibit signal being coupled to said gating means for inhibiting the development of said reset signals at times other than during said interval, said predetermined interval corresponding generally to the time of occurrence of said derived vertical sync pulse.

9. The digital vertical sync system as claimed in claim 8 wherein said noise immunizing means further includes a NAND gate for developing said reset signals at the end of said interval whenever said derived sync pulse does not occur during said interval.

10. The digital vertical sync system as claimed in claim 8 wherein said switch means develops first and second complementary control signals for application to said gating means and said noise immunizing means, said complementary control signals conditioning said digital synchronization system to either synchronous operation or asynchronous operation.

11. The digital vertical sync system as claimed in claim 10 further including a NOR gate interposed beween said gating means and said counter means and a NAND gate interposed between said noise immunizing means and said gating means, said first complementary control signal being applied to said NOR gate during asynchronous operation for maintaining said gating means ready to generate said reset signal for each said derived vertical sync pulse during each vertical field, and said second complementary control signal being coupled to said NAND gate for disabling said noise immunizing means during synchronous operation.

* * * * *